United States Patent Office 3,629,460
Patented Dec. 21, 1971

3,629,460
METHOD OF COMBATING COTTON PESTS
Volker Dittrich, Basel, Switzerland, assignor to
Ciba Limited, Basel, Switzerland
No Drawing. Continuation of application Ser. No.
564,553, July 12, 1966. This application Sept. 24,
1969, Ser. No. 860,840
Int. Cl. A01n 9/20
U.S. Cl. 424—326  4 Claims

ABSTRACT OF THE DISCLOSURE

There is provided a novel process for protecting cotton plants from attack by insects harmful to cotton by applying to said plants an insecticidally effective amount of N-(2-methyl-4-chlorophenyl)-N'-dimethylformamidine.

---

This application is a continuation of Ser. No. 564,553, filed July 12, 1966 and now abandoned.

The present invention provides a method of treating cotton plants to combat insects harmful to them, wherein cotton plants are treated with a compound of the formula

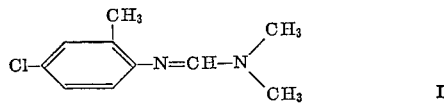

This compound may be used in the solid state, but it is preferably used in the liquid or gaseous state.

More particularly, the present invention provides a method as defined above, wherein the insects are Lepidoptera, Coleoptera, *Prodenia litura* and Heliothis and the said pests are in the egg stage.

The control of insects harmful to cotton by means of insecticides has been beset with great difficulties right up to the present day. The larvae of Lepidoptera and Coleoptera (bollworms, bollweevils) bore their way deep into the tissue of the plant and are unaffected by preparations that are applid to protect plants.

Hitherto, leaf-eaters (leafworms, for example, *Prodenia litura*) have been controlled with chemicals, but the preparations used were either not effective enough or their action was of too short a duration, and they also displayed a relatively high degree of mammalian toxicity. There is a further drawback associated with control at the larval stage in that, generally, as the larval stage develops, so the action of the insecticide becomes weaker. In these circumstances, the plants can suffer considerable damage before protective measures take effect. It is therefore a great advantage if effective control can be exerted at the egg stage. The hatched larvae cannot destroy leaves or reach safety in the interior of the cotton boll. Since the eggs cannot be poisoned by the ingestion of food or by contact with the treated surface of the plant it is necessary that they be attacked with an active vaporous form of an ovicide.

The observation has been made that preparations containing the active principle of the above formula are lethal to all eggs of *Prodenia litura* on cotton plants when used in concentrations of not more than 250 p.p.m., preferably within the range of from 50 to 250 p.p.m. and advantageously within the range of from 100 to 250 p.p.m. It is preferable to apply the compound in the form of an emulsion. It is immaterial whether the eggs are directly wetted with the emulsion or are simply exposed to the vaporizing active principle.

Furthermore, the preparations of the invention can be made up in a very wide variety of forms. Solutions of the compounds of the Formula I for use as direct sprays can be prepared, for example, with mineral oil fractions in the high to medium boiling range, preferably above 100° C. for example, Diesel oil, kerosene; coal-tar oils; oils of vegetable and animal origin, and also hydrocarbons, for example, alkylated naphthalenes, tetrahydronaphthalene, if necessary, in the presence of xylene mixtures, cyclohexanols and ketones, and also chlorinated hydrocarbons, for example, trichloroethane, tetrachloroethane, trichloroethylene, trichlorobenzene and tetrachlorobenzene.

Aqueous preparations may be made, for example, from emulsion concentrates, pastes or wettable powders by the addition of water. The emulsifying or dispersing agents used are, for example, non-ionic products, for example, the condensation products of aliphatic alcohols, amines or carboxylic acids having a long-chain hydrocarbon radical of 10 to 20 carbon atoms and ethylene oxide, for example, the condensation product of octadecyl alcohol and 25 to 30 mols of ethylene oxide or the product of soyabean fatty acid and 30 mols of ethylene oxide or the product of commercial oleylamine and 15 mols of ethylene oxide or the product of dodcylmercaptan and 12 mols of ethylene oxide. Anionic emulsifying agents that may be used are the sodium salt of dodecyl alcohol sulfuric acid ester, the sodium salt of dodecyl benzene sulfonic acid, the potassium or triethanolamine salt of oleic acid or abietic acid or mixtures of these acids or the sodium salt of a petroleum sulfonic acid. Cationic dispersing agents that may be used are quaternary ammonium compounds, for example, cetylpyridinium bromide or dihydroxyethylbenzyldodecylammonium chloride.

Solid carrier substances that may be used in the preparation of dusting and strewing agents are talcum, kaolin, bentonite, calcium carbonate, calcium phosphate, and also charcoal, cork meal, wood meal and other materials of vegetable origin. It is also highly advantageous to make the preparations in the form of granules. The preparations in their various forms may also incorporate the usual substances that improve dispersion, adhesion, resistance to rain and penetration; such substances are, for example, fatty acids, resins, glues, casein and alginates.

The preparations of the invention may be used alone or together with the usual pesticides, especially insecticides, acaricides, nematicides, bactericides or fungicides or selective herbicides.

The following example illustrates the invention:

EXAMPLE (a) An emulsion concentrate of the following composition was prepared:

50 grams of the active principle of the formula

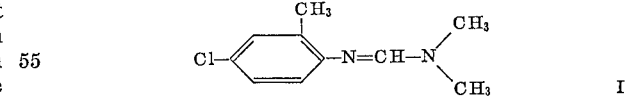

11 grams of an emulsifier consisting of a mixture of an anionic surface-active compound, preferably the calcium or magnesium salt of monolauryl-benzene monosulfonic acid, and a non-ionic surface-active compound, preferably a polyethylene glycol ether of the monolauryl ester of sorbic acid, and 39 grams of xylene ---
100 grams This emulsion concentrate can be diluted with water to form an emulsion.

(b) Boll-bearing cotton plants about 50 cm. high were introduced into cages containing *Prodenia* moths; the moths laid most of their eggs on the underside of the leaves. In the first series of experiments the plants and eggs were sprayed from all sides with two different concentrations of an emulsion prepared according to (a); the plants were sprayed until dripping wet. In the second series of experiments the plants on which the eggs had been laid were sprayed from above only in form of a drain, the eggs therefore not being wetted directly.

In the following table, the first method of treatment is designated "contact" and the two repeats of the second method of treatment are designated "A" and "B" respectively.

The following table shows the results:

|  | Conc., p.p.m. | Total No. of eggs | Number of larvae hatched | Number of eggs killed | Mortality in percent |
|---|---|---|---|---|---|
| 1st treatment: | | | | | |
| A | 250 | 100 | 10 | 90 | 90 |
| B | | 199 | 11 | 188 | 94 |
| Contact | | 77 | 3 | 74 | 96 |
| A | | 140 | 16 | 124 | 88 |
| B | 125 | 117 | 6 | 111 | 95 |
| Contact | | 177 | 7 | 170 | 96 |
| 2nd treatment: | | | | | |
| A | | 40 | 3 | 37 | 92.5 |
| B | 250 | 115 | 7 | 108 | 93.9 |
| Contact | | 116 | 5 | 111 | 96 |
| A | | 150 | 8 | 142 | 94.6 |
| B | 125 | | | | |
| Contact | | 151 | 5 | 146 | 96.6 |

It can be seen from the able that concentrations of 250 and 125 p.p.m. of active principle are lethal to the eggs of *Prodenia litura* on cotton plants. It is immaterial whether the eggs are directly wetted with the preparation or not; when the eggs are not wetted, the vapour phase of the preparation ensures a high degree of mortality.

Similar treatments also produced almost 100% mortality in the case of Heliothis.

I claim:
1. A method of combatting on cotton plants insects harmful to said plants which comprises causing said insects on said plants to be contacted with an insecticidally effective amount of the compound of the formula

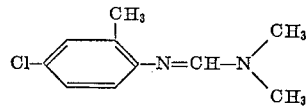

2. A method according to claim 1 wherein the mode of application is spraying.
3. A method according to claim 1 for combating insects on cotton plants wherein the insects are Lepidoptera and Coleoptera and said insects are in the egg stage.
4. A method according to claim 3 wherein the insects are *Prodenia litura* and Heliothis and the mode of application is by spraying.

References Cited

UNITED STATES PATENTS 3,288,671  11/1966  Greenbaum _____ 424—202
3,365,465  11/1968  Greenbaum _____ 424—202

FOREIGN PATENTS 1,172,081  11/1963  Germany.

OTHER REFERENCES

Congress, Public Law 104, Fed. Insecticide, Fungicide and Rodenticide Act (1947), Sec. 2, subsec. h.

STANLEY J. FRIEDMAN, Primary Examiner